United States Patent
Bellofatto et al.

(10) Patent No.: US 8,595,554 B2
(45) Date of Patent: Nov. 26, 2013

(54) REPRODUCIBILITY IN A MULTIPROCESSOR SYSTEM

(75) Inventors: Ralph A. Bellofatto, Ridgefield, CT (US); Dong Chen, Croton On Hudson, NY (US); Paul W. Coteus, Yorktown Heights, NY (US); Noel A. Eisley, Yorktown Heights, NY (US); Alan Gara, Mount Kisco, NY (US); Thomas M. Gooding, Rochester, MN (US); Rudolf A. Haring, Cortlandt Manor, NY (US); Philip Heidelberger, Cortlandt Manor, NY (US); Gerard V. Kopcsay, Yorktown Heigths, NY (US); Thomas A. Liebsch, Arlington, SD (US); Martin Ohmacht, Yorktown Heights, NY (US); Don D. Reed, Rochester, MN (US); Robert M. Senger, Tarrytown, NY (US); Burkhard Steinmacher-Burow, Esslingen (DE); Yutaka Sugawara, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/774,475

(22) Filed: May 5, 2010

(65) Prior Publication Data

US 2011/0119521 A1    May 19, 2011

Related U.S. Application Data

(60) Provisional application No. 61/261,269, filed on Nov. 13, 2009, provisional application No. 61/293,611, filed on Jan. 8, 2010, provisional application No. 61/295,669, filed on Jan. 15, 2010, provisional application No. 61/293,237, filed on Jan. 8, 2010, provisional application No. 61/299,911, filed on Jan. 29, 2010, provisional application No. 61/293,552, filed on Jan. 8, 2010, provisional application No. 61/293,494, filed on Jan. 8, 2010, provisional application No. 61/293,476, filed on Jan. 8, 2010, provisional application No. 61/293,554, filed on Jan. 8, 2010, provisional application No. 61/293,559, filed on Jan. 8, 2010, provisional application No. 61/293,569, filed on Jan. 8, 2010, provisional application No. 61/293,499, filed on Jan. 8, 2010, provisional application No. 61/293,266, filed on Jan. 8, 2010, provisional application No. 61/293,603, filed on Jan. 8, 2010, provisional application No. 61/299,918, filed on Jan. 29, 2010.

(51) Int. Cl.
*G06F 11/00*       (2006.01)

(52) U.S. Cl.
USPC ............................... 714/27; 714/30; 714/731

(58) Field of Classification Search
None
See application file for complete search history.

(56) References Cited

U.S. PATENT DOCUMENTS

| 5,020,023 A | 5/1991 | Smith |
| 5,249,206 A | 9/1993 | Appelbaum et al. |

(Continued)

OTHER PUBLICATIONS

M.Abbott, et al. "Durable Memory RS/6000 System Design", The 24th Annual International Symposium on Fault Tolerant Computing FTCS-24 Austin, Texas, USA; Jun. 15-17, 1994.

(Continued)

*Primary Examiner* — Michael Maskulinski
(74) *Attorney, Agent, or Firm* — Scully, Scott, Murphy & Presser, P.C.; Daniel P. Morris, Esq.

(57) ABSTRACT

Fixing a problem is usually greatly aided if the problem is reproducible. To ensure reproducibility of a multiprocessor system, the following aspects are proposed: a deterministic system start state, a single system clock, phase alignment of clocks in the system, system-wide synchronization events, reproducible execution of system components, deterministic chip interfaces, zero-impact communication with the system, precise stop of the system and a scan of the system state.

23 Claims, 5 Drawing Sheets

(56) References Cited

U.S. PATENT DOCUMENTS

| | | | | |
|---|---|---|---|---|
| 5,355,468 | A | * | 10/1994 | Jeppesen et al. .................. 714/34 |
| 7,240,266 | B2 | * | 7/2007 | Farmer et al. .................. 714/731 |
| 7,299,392 | B2 | * | 11/2007 | Date et al. ...................... 714/731 |
| 2010/0235698 | A1 | * | 9/2010 | Diewald et al. ................ 714/731 |
| 2012/0117413 | A1 | * | 5/2012 | Asaad et al. ................... 713/501 |

OTHER PUBLICATIONS

Haring, et al. "Blue Gene/L compute chip: Control, test, and bring-up infrastructure", IBM J. Res. & Dev. vol. 49 No. 2/3, Mar./May 2005 pp. 289-301.

"Ethernet", Wikipedia, (May 3, 2010), pp. 1-16.

"Joint Test Action Group", Wikipedia, (May 3, 2010), pp. 1-12.

"Message queue", Wikipedia, (May 3, 2010), pp. 1-3.

Coteus et al., "Packaging the Blue Gene/L supercomputer", IBM J. Res. & Dev. vol. 49 No. 2/3 Mar./May 2005, pp. 213-248.

"Shift register", Wikipedia, (May 3, 2010), pp. 1-3.

"Synchronous dynamic random access memory", Wikipedia, (May 3, 2010), pp. 1-10.

Bright et al., "Blue Gene/L compute chip: Synthesis, timing, and physical design", IBM J. Res. & Dev. vol. 49 No. 2/3 Mar./May 2005, pp. 277-287.

* cited by examiner

REPRODUCIBILITY IN A MULTIPROCESSOR SYSTEM

CROSS-REFERENCE TO RELATED APPLICATIONS

This application claims the benefit of U.S. Patent Application Ser. Nos. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, filed Jan. 4, 2011, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 61/299,911, filed Jan. 29, 2010, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308, filed Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITHIN SPECULATIVE EXECUTION"; U.S. patent application Ser. No. 12/984,329, filed Jan. 4, 2011, for "PHYSICAL ALIASING FOR THREAD LEVEL SPECULATION WITHIN A SPECULATION BLIND CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, filed Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, filed Jan. 29, 2011 for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010, for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277) for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389, filed Jun. 8, 2010, for "BALANCING WORKLOAD IN A MULTIPROCESSOR SYSTEM RESPONSIVE TO PROGRAMMABLE ADJUSTMENTS IN SYNCHRONIZATION INSTRUCTION"; U.S. patent application Ser. No. 12/696,817, filed Jan. 29, 2010, for "HEAP/STACK GUARD PAGES USING A WAKEUP UNIT"; and U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR".

PRIORITY CLAIM

This disclosure claims priority from U.S. Provisional Patent Application No. 61/299,918, filed on Jan. 29, 2010, the entire contents and disclosure of which is expressly incorporated by reference herein as if fully set forth herein.

GOVERNMENT CONTRACT

This invention was made with government support under Contract No. B554331 awarded by the Department of Energy. The Government has certain rights in this invention

BACKGROUND

The invention relates to the field of debugging multiprocessor systems, and particularly to the area of reproducing an application execution which encounters an error situation. The error situation could be from hardware or software.

A multiprocessor system includes a large number of processor chips and other chips. Various factors make it difficult for a multiprocessor system to offer reproducibility. For example, the signalling between chips in a multiprocessor system is today typically based on high-speed signalling techniques where the transit time of data is much longer than the effective "bit time" of the transmission. Such an asynchronous interconnect does not easily offer reproducibility.

Without reproducibility, a multiprocessor system instead typically offers other methods to assist in their debugging. Multiprocessor systems to date thus typically offer elaborate hardware checking mechanisms which are often complex, expensive in terms of effort and silicon cost and power, and generally do not address all potential debugging situations. An example of such a hardware checking mechanism is a trace buffer which can record some of the past actions of the hardware.

One document that deals with reliability in power PC's is M. Abbott et al. "Durable Memory RS/6000™ System Design" The 24th Annual International Symposium on Fault Tolerant Computing FTCS-24 1 Austin, Tex., USA; Jun. 15-17, 1994 the contents and disclosure of which are incorporated by reference as if fully set forth herein.

SUMMARY

Thus it is desirable for a multiprocessor system to offer reproducibility. In general, fixing a problem is usually greatly aided if the problem is reproducible.

Even with reproducibility, the hardware checking mechanisms mentioned above can remain relevant. For example, a multiprocessor system fail might involve interaction with the outside world. Even if the multiprocessor system itself can execute reproducibly, it may be infeasible to make reproducible the particular interaction with the outside world required to trigger the fail.

This disclosure describes a set of aspects allowing a multiprocessor system to offer reproducibility. The aspects include one or more of
 a deterministic system start state,
 a single system clock,
 phase alignment of clocks in the system,
 system-wide synchronization events,
 reproducible execution of system components,
 deterministic chip interfaces,
 zero-impact communication with the system,
 precise stop of the system, and
 a scan of the system state.
Objects and advantages will be apparent in the following.

BRIEF DESCRIPTION OF FIGURES

Embodiments will now be described by way of non-limiting example with reference to the following figures.

DETAILED DESCRIPTION

Figure 1:
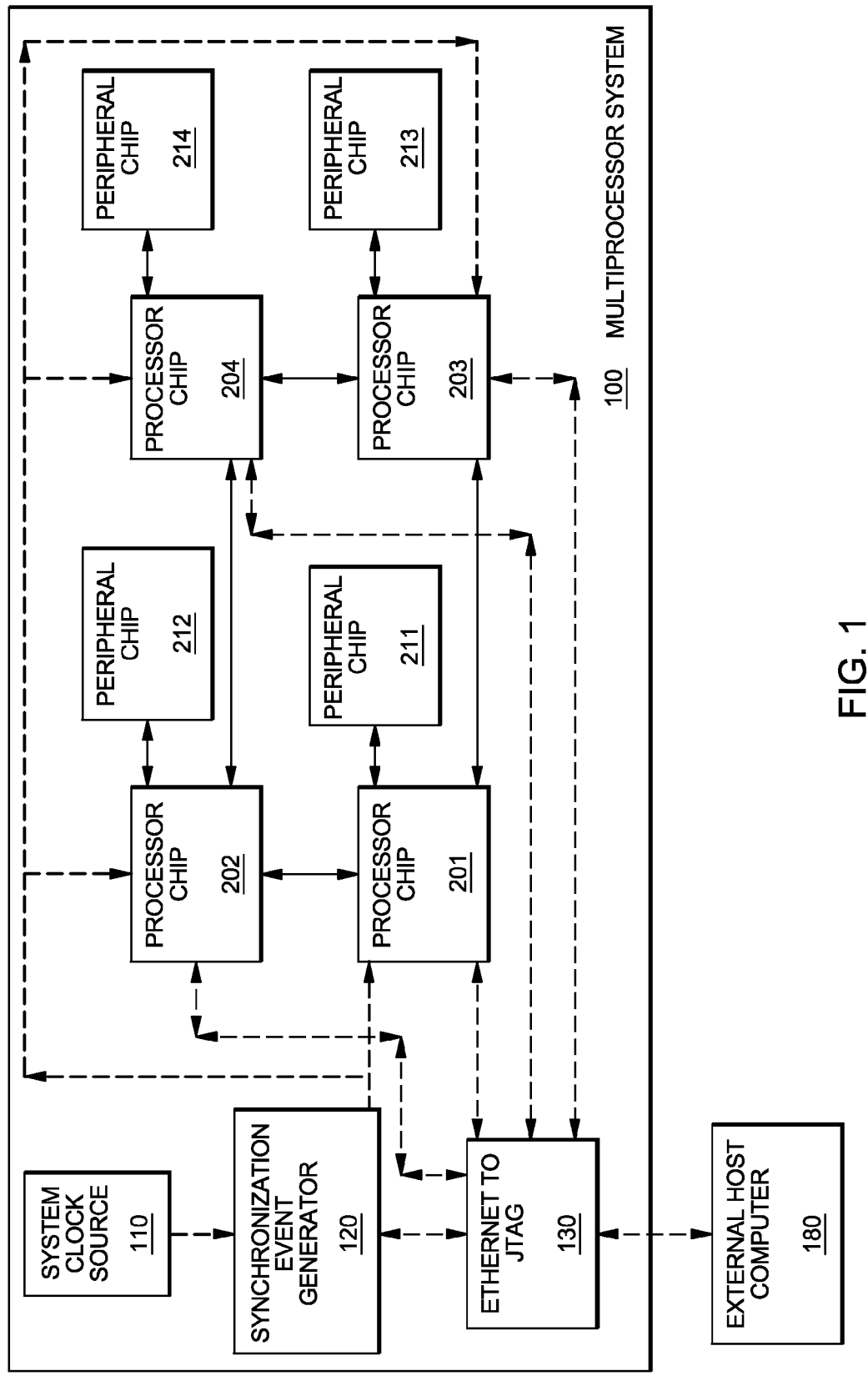
FIG. 1 shows a multiprocessor system with reproducibility.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

With respect to software elements, any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or method block diagrams, and combinations of blocks in the flowchart illustrations and/or method block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiment here arose in the context of the multiprocessor system that is described in more detail in the co-pending applications incorporated by reference herein.

1.1. Using Reproducibility to Debug a Multiprocessor System

If a multiprocessor system offers reproducibility, then a test case can be run multiple times and exactly the same behavior will occur in each run. This also holds true when there is a bug in the hardware logic design. In other words, a test case failing due to a bug will fail in the same fashion in every run of the test case. With reproducibility, in each run it is possible to precisely stop the execution of the program and examine the state of the system. Across multiple runs, by stopping at subsequent clock cycles and extracting the state information from the multiprocessor system, chronologically exact hardware behavior can be recorded. Such a so-called event trace usually greatly aids identifying the bug in the hardware logic design which causes the test case to fail. It can also be used to debug software.

Debugging the hardware logic may require analyzing the hardware behavior over many clock cycles. In this case, many runs of the test case are required to create the desired event trace. It is thus desirable if the time and effort overhead between runs is kept to a minimum. This includes the overhead before a run and the overhead to scan out the state after the run.

1.2. Aspects Allowing a Multiprocessor System to Offer Reproducibility

Below are described a set of aspects allowing a multiprocessor system to offer reproducibility.

1.2.1. Deterministic System Start State

Advantageously, the multiprocessor system is configured such that reproducibility-relevant initial states are set to a fixed value. The initial state of a state machine is an example of reproducibility-relevant initial state. If the initial state of a state machine differs across two runs, then the state machine will likely act differently across the two runs. The state of a state machine is typically recorded in a register array.

Various techniques are used to minimize the amount of state data to be set between runs and thus to reduce the overhead between reproducible runs.

For example, each unit on a chip can use reset to reproducibly initialize much of its state, e.g. to set its state machines. This minimizes the number of unit states that have to be set by an external host or other external agent before or after reset.

Another example would be, having the test case program code and other initially-read contents of DRAM memory retained between runs. In other words, the DRAM memory unit need not be reset between runs and thus only some of the contents may need to be set before each run.

The remaining state data within the multiprocessor system should be explicitly set between runs. This state can be set by an external host computer as described below. The external host computer controls the operation of the multiprocessor system. For example, in FIG. 1, the multiprocessor system 100 is controlled by the external host computer 180. The external host computer 180 uses Ethernet to communicate with the Ethernet to JTAG unit 130 which has a JTAG interface into the processor chips 201, 202, 203 and 204. An example of box 130 is described in FIG. 28 and related text in http://www.research.ibm.com/journal/rd49-23.html "*Packaging the Blue Gene/L supercomputer*" P. Coteus, H. R. Bickford, T. M. Cipolla, P. G. Crumley, A. Gara, S. A. Hall, G. V. Kopcsay, A. P. Lanzetta, L. S. Mok, R. Rand, R. Swetz, T. Takken, P. La Rocca, C. Marroquin, P. R. Germann, and M. J.

Jeanson ("Coteus et al."), the contents and disclosure of which are incorporated by reference as if fully set forth herein.

Figure 2:
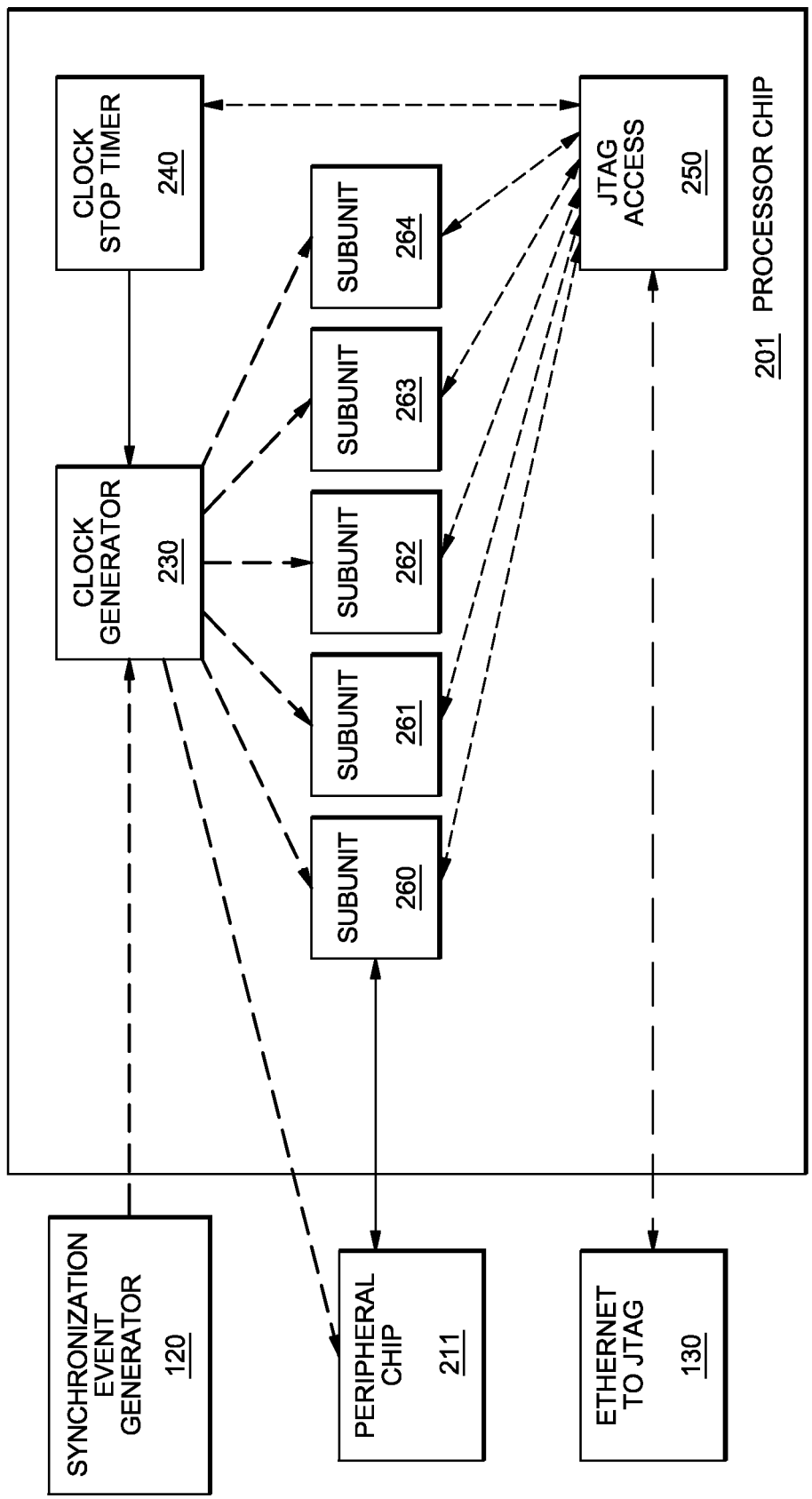
FIG. 2 shows a processor chip with a clock stop timer and the ability for an external host computer via Ethernet to read or set the internal state of the processor chip.

As illustrated in FIG. 2, the Ethernet to JTAG unit 130 communicates via the industry-standard JTAG protocol with the JTAG access unit 250 within the processor chip 201. The JTAG access unit 250 can read and write the state in the subunits 260, 261, 262, 263 and 264 of the 201 processor chip. An example of box 250 is described in FIG. 1 and related text in http://w3.research.ibm.com/journal/rd49-23.html "Blue Gene/L computer chip: Control, test, and bring-up infrastructure" R. A. Haring, R. Bellofatto, A. A. Bright, P. G. Crumley, M. B. Dombrowa, S. M. Douskey, M. R. Ellaysky, B. Gopalsamy, D. Hoenicke, T. A. Liebsch, J. A. Marcella, and M. Ohmacht, the contents and disclosure of which are incorporated by reference as if fully set forth herein. As required, the external host computer 180 can set the state of the subunit 260 and other subunits within the multiprocessor system 100.

1.2.2. A Single System Clock

To achieve system wide reproducibility, a single system clock drives the entire multiprocessor system. Such a single system clock and its distribution to chips in the system is described on page 227 section 'Clock Distribution' of Coteus et al.

The single system clock has little to no negative repercussions and thus also is used to drive the system in regular operation when reproducibility is not required. In FIG. 1, the multiprocessor system 100 includes a single system clock source 110. The single system clock is distributed to each processor chip in the system. In FIG. 1, the clock signal from system clock source 110 passes through the synchronization event generator 120 described further below. In FIG. 1, the clock signal drives the processor chips 201, 202, 203 and 204.

Within the clock distribution hardware of the preferred embodiment, the drift across processor chips across runs has been found to be too small to endanger reproducibility. In FIG. 1, the clock distribution hardware is illustrated as the dotted lines.

In the alternative, multiple clocks would drive different processing elements and would likely result in frequency drift that would break reproducibility. In the time of a realistic test case run, the frequencies of multiple clocks can drift over many cycles. For example, for a 1 GHz clock signal, the drift across multiple clocks must be well under 1 in a billion to not drift a cycle in a one second run.

1.2.3. System-Wide Phase Alignment

The single system clock described above allows for a system-wide phase alignment of all reproducibility-relevant clock signals within the multiprocessor system. Each processor chip uses the single system clock to drive its phase-lock-loop units and other units creating other clock frequencies used by the processor chip. An example of such a processor chip and other units is the IBM® BlueGene® node chip with its peripheral chips, such as DRAM memory chips.

In FIG. 1 and FIG. 2, the processor chip 201 receives its incoming clock signal via the synchronization event generator 120 described below. In FIG. 2 illustrating the 201 processor chip, the incoming clock signal drives the clock generator 230, which contains the units creating the clock frequencies used by the processor chip and its peripheral chips. The various clock signals from clock generator 230 drive the various subunits 260, 261, 262, 263 and 264 as well as the peripheral chip 211.

The clock generator 230 can be designed such that the phases of the system clock and the derived clock frequencies are all aligned. Please see the following paper for a similar clock generator with aligned phases: A. A. Bright, "Creating the Blue Gene/L Supercomputer from Low Power System-on-a-Chip ASICs," Digest of Technical Papers, 2005 IEEE International Solid-State Circuits Conference, or see FIG. 5 and associated text in http://www.research.ibm.com/journal/rd49-23.html "Blue Gene/L compute chip: Synthesis, timing, and physical design" A. A. Bright, R. A. Haring, M. B. Dombrowa, M. Ohmacht, D. Hoenicke, S. Singh, J. A. Marcella, R. F. Lembach, S. M. Douskey, M. R. Ellaysky, C. G. Zoellin, and A. Gara. The contents and disclosure of both articles are incorporated by reference as if fully set forth herein.

This alignment ensures that across runs there is the same phase relationship across clocks. This alignment across clocks thus enables reproducibility in a multiprocessor system.

With such a fixed phase relationship across runs, an action of a subsystem running on its clock occurs at a fixed time across runs as seen by any other clock. Thus with such a fixed phase relationship across runs, the interaction of subsystems under different clocks is the same across runs. For example, assume that clock generator 230 drives subunit 263 with 100 MHz and subunit 264 with 200 MHz. Since clock generator 230 aligns the 100 MHz and 200 MHz clocks, the interaction of subsystem 263 with subunit 264 is the same across runs. If the interaction of the two subsystems is the same across runs, the actions of each subunit can be the same across runs.

A more detailed system-wide phase alignment is described below in section '1.2.4 System-wide synchronization events.'

1.2.4. System-Wide Synchronization Events

The single system clock described above can carry synchronization events. In FIG. 1 illustrating the Multiprocessor system 100, the synchronization event generator 120 can add one or more synchronization events to the system clock from the system clock source 110. The synchronization event generator 120 is described in a "Global Synchronization of Parallel Processors Using Clock Pulse Width Modulation" U.S. Patent Application Ser. No. 61/293,499, filed Jan. 8, 2010 ("Global Sync") the contents and disclosure of which are incorporated by reference as if fully set forth herein. The external host computer 180 uses the Ethernet-to-JTAG unit 130 to control the synchronization event generator 120 to insert one or more synchronization events onto the system clock.

The external host computer 180 controls the operation of the multiprocessor system 100. The external host computer 180 uses a synchronization event to initiate the reset phase of the processor chips 201, 202, 203, 204 in the multiprocessor system 100.

As described above, within a processor chip, the phases of the clocks are aligned. Thus like any other event on the system clock, the synchronization event occurs at a fixed time across runs with respect to any other clock. The synchronization event thus synchronizes all units in the multiprocessor system, whether they are driven by the system clock or by clocks derived from clock generator 230.

The benefit of the above method can be understood by examining a less desirable alternative method. In the alternative, there is a separate network fanning out the reset to all chips in the system. If the clock and reset are on separate networks, then across runs the reset arrival times can be skewed and thus destroy reproducibility. For example, on a first run, reset might arrive 23 cycles earlier on one node than another. In a rerun, the difference might be 22 cycles.

The method of this disclosure as used in BG/Q is described below. Particular frequency values are stated, but the technique is not limited to those and can be generalized to other frequency values and other ratios between frequencies as a matter of design choice.

The single system clock source 110 provides a 100 MHz signal, which is passed on by the synchronization event generator 120. On the processor chip 201, 33 MHz is the greatest common divisor of all on-chip clock frequencies, including the incoming 100 MHz system clock, the 1600 MHz processor cores and the 1633 MHz external DRAM chips. In FIG. 2, subunit 261 could illustrate such a 1600 MHz processor chip. The peripheral chip 211 could illustrate such 1633 MHz external DRAM chip and subunit 260 could illustrate a memory controller subunit.

Per the above-mentioned 'GLOBAL SYNC . . . ' co-pending application on the synchronization event generator 120, the incoming 100 MHz system clock is internally divided-by-3 to 33 MHz and a fixed 33 MHz rising edge is selected from among 3 possible 100 MHz clock edges. The synchronization event generator 120 generates synchronization events at a period that is a (large) multiple of the 33 MHz period. The large period between synchronization events ensure that at any moment there is at most one synchronization event in the entire system. Each synchronization event is a pulse width modulation of the outgoing 100 MHz system clock from the synchronization event generator 120.

On the processor chip 201, the incoming 100 MHz system clock is divided-by-3 to an on-chip 33 MHz clock signal. This on-chip 33 MHz signal is aligned to the incoming synchronization events which are at a period that is a (large) multiple of the 33 MHz period. Thus there is a system wide phase alignment across all chips for the 33 MHz clock on each chip. On the processor chip 201, all clocks are aligned to the on-chip 33 MHz rising edge. Thus there is a system wide phase alignment across all chips for all clocks on each chip.

An application run involves a number of configuration steps. A reproducible application run may require one or more system-wide synchronization events for some of these steps. For example, on the processor chip 201, the configuration steps: e.g. clock start, reset, and thread start, can each occur synchronized to an incoming synchronization event. Each step is thus synchronized and thus reproducible across all processor chips 201-204. On each processor chip, there is an option to delay a configuration step by a programmable number of synchronization events. This allows a configuration step to complete on different processor chips at different times. The delay is chosen to be longer than the longest time required on any of the chips for that configuration step. After the configuration step, due to the delay, between any pair of chips, there is the same fixed phase difference across runs. The exact phase difference value is typically not of much interest and typically differs across different pairs of chips.

1.2.5. Reproducibility of Component Execution

On each chip, each component or unit or subunit has a reproducible execution. As known to anyone skilled in the art, this reproducibility depends upon various aspects. Examples of such aspects include:

each component having a respective consistent initial state as described above;

coordinating reset across components;

if a component has some internally irrelevant but externally visible non-deterministic behavior, this non-deterministic behavior should be prevented from causing non-deterministic behavior in another component. This might include:

the other component ignoring incoming signals during reset;

the component outputting fixed values on outgoing signals during reset.

1.2.6. Deterministic Chip Interfaces

Advantageously, to achieve reproducibility, within the multiprocessor system the interfaces across chips will be deterministic. In the multiprocessor system 100 of FIG. 1, the processor chip 202 has an interface with its peripheral chip 212 as well with the process chips 201 and 204. In order to achieve deterministic interfaces, a number of features may be implemented.

These include the following alternatives. A given interface uses one of these or another alternative to achieve a deterministic interface. On a chip with multiple interfaces, each interface could use a different alternative:

Interfaces across chips, such as high speed serialization network interfaces, often utilize asynchronous macros or subunits which can result in non-deterministic behavior. For example, for the processor chip 201 in FIG. 1, the solid thick double-ended arrow could be such an interface to the processor chip 202. The solid thin double-ended arrow could be such an interface to the peripheral chip 211. The interface can be treated as a static component and not reset across runs and thus the incoming clock or clocks are left running across runs. This is done on both chips of the interface. By not resetting the macro and by leaving the clocks running, the macro will behave the same across runs. In particular, by not resetting the macro, the interface delay across chips remains the same across runs.

Alternatively, one can attempt to determine the interface delay within the asynchronous macro and then compensate for this delay from run to run by additionally delaying the communication by passing it through an adjustable shift register. (For explanation of shift register see http://en.wikipedia.org/wiki/Shift_register) The length of delay given by the shift register is chosen in each run such that the total delay given by the network interface plus the shift register is the same across runs. To achieve this, the shift register needs sufficient delay range to compensate for the variation across runs for the interface delay. This is typically the case when re-running on fixed hardware, as typical to debug the hardware design. If a hardware unit is replaced by an identical hardware unit across runs, then the delay shift register may or may not have sufficient delay to compensate for the interface delay. If sufficient, then this can be used to identify a failed hardware unit. This is done by comparing a run on the unknown hardware unit to a run on a known-good hardware unit.

Alternatively, interfaces across chips will be made synchronous, rather than asynchronous, with clocks that are deterministic and related by a fixed ratio to the system clock frequency. An example of such a synchronous interface follows. "SDRAM has a synchronous interface, meaning that it waits for a clock signal before responding to control inputs and is therefore synchronized with the computer's system bus." from http://en.wikipedia.org/wiki/Synchronous_dynamic_random_access_memory 1.2.7. Zero-Impact Communication with the Multiprocessor System Communication with the multiprocessor system is designed to not break reproducibility. For example, all program input is stored within the multiprocessor system before the run. Such input is part of the deterministic start state described above. For example, output from a processor chip, such as printf( ), uses a message queue, such as described in http://en.wikipedia.org/wiki/Message_queue, also known as a "mailbox," which can be read by an outside system without impacting the processor chip operation in any way. In FIG. 2 of the processor chip 201, the JTAG access unit 250 can be used to read out the subunit 262, which could serve as such a mailbox. As mentioned above, reproducibility means that the interaction of the subunit 262 with the rest of the processor chip 201 should not be affected by a read or no read from the JTAG access 250. For example, subunit 262 may be dual-ported, such that a read or write by JTAG access 250 does not change the cycle-by-cycle read or writes from the rest of the processor chip 201. Alternatively, JTAG access 250, can be given low priority such that a read or write to subunit 262 may be delayed and only satisfied when there are no requests from the rest of the processor chip 201.

1.2.8. Precise Stopping of System State

One enabler of reproducible execution is the ability to precisely stop selected clocks. The precise stopping of the clocks may be designed into the chips and the multiprocessor system to accomplish this. As illustrated in FIG. 2, the embodiment here has a clock stop timer 240 on the processor chip 201. Before the run, the clock stop timer 240 is set to a threshold value via the JTAG access 250. The value is the instance of application execution of interest. For example, section '1.3 Recording the chronologically exact hardware behavior' describes how the value is set in each of multiple runs. Also before the run, the clock generator 230 is configured to stop selected clocks upon input from the clock stop timer 240. When the clock stop timer 240 reaches the threshold value, it sends a signal to the clock generator 230 which then halts the pre-selected clocks on the processor chip 201. In FIG. 1, by having processor chips 201, 202, 203, 204 in the multiprocessor system 100 follow this process, precise stopping can be achieved across the entire multiprocessor system 100. This precise stopping can be thought of as a doomsday type clock for the entire system.

Selected clocks are not stopped. For example, as described in section '1.2.6 Deterministic Chip Interfaces', some subunits continue to run and are not reset across runs. As described in section '1.2.9 Scanning of system state', a unit is stopped in order to scan out its state. The clocks chosen to not be stopped are clocks that do not disturb the state of the units to be scanned. For example, the clocks to a DRAM peripheral chip do not change the values stored in the DRAM memory.

This technique of using a clock stop timer 240 may be empirical. For example, when a run initially fails on some node, the timer can be examined for the current value C. If the failing condition is assumed to have happened within the last N cycles, then the desired event trace is from cycle C–N to cycle C. So on the first re-run, the clock stop timer is set to the value C–N, and the state at cycle C–N is captured. On the next re-run, the clock stop timer is set to the value C–N+1, and the state at cycle C–N+1 can be captured. And so on, until the state is captured from cycle C–N to cycle C.

1.2.9. Scanning of System State

After the clocks are stopped, as described above, the state of interest in the chip is advantageously extractable. An external host computer can scan out the state of latches, arrays and other storage elements in the multiprocessor system.

This is done using the same machinery described in section 1.2.1 which allows an external host computer to set the deterministic system start state before the beginning of the run. As illustrated in FIG. 1, the external host 180 computer uses Ethernet to communicate with the Ethernet to JTAG unit 130 which has a JTAG interface into the processor chips 201, 202, 203 and 204. As illustrated in FIG. 2 the Ethernet to JTAG unit 130 communicates via the industry-standard JTAG protocol with the JTAG access unit 250 within the processor chip 201. The JTAG access unit 250 can read and write the state in the subunits 260, 261, 262, 263 and 264 of the processor chip 201. As required, the external host computer 180 can read the state of the subunit 260 and other subunits within the multiprocessor system 100.

1.3. Recording the Chronologically Exact Hardware Behavior

If a multiprocessor system offers reproducibility then a test case can be run multiple times and exactly the same behavior will occur in each run. This also holds true when there is a bug in the hardware logic design. In other words, a test case failing due to a bug will fail in the same fashion in every run of the test case. With reproducibility, in each run it is possible to precisely stop the execution of the program and examine the state of the system. Across multiple runs, by stopping at subsequent clock cycles and extracting the state information, the chronologically exact hardware behavior can be recorded. Such a so-called event trace typically makes it easy to identify the bug in the hardware logic design which is causing the test case to fail.

Figure 3:
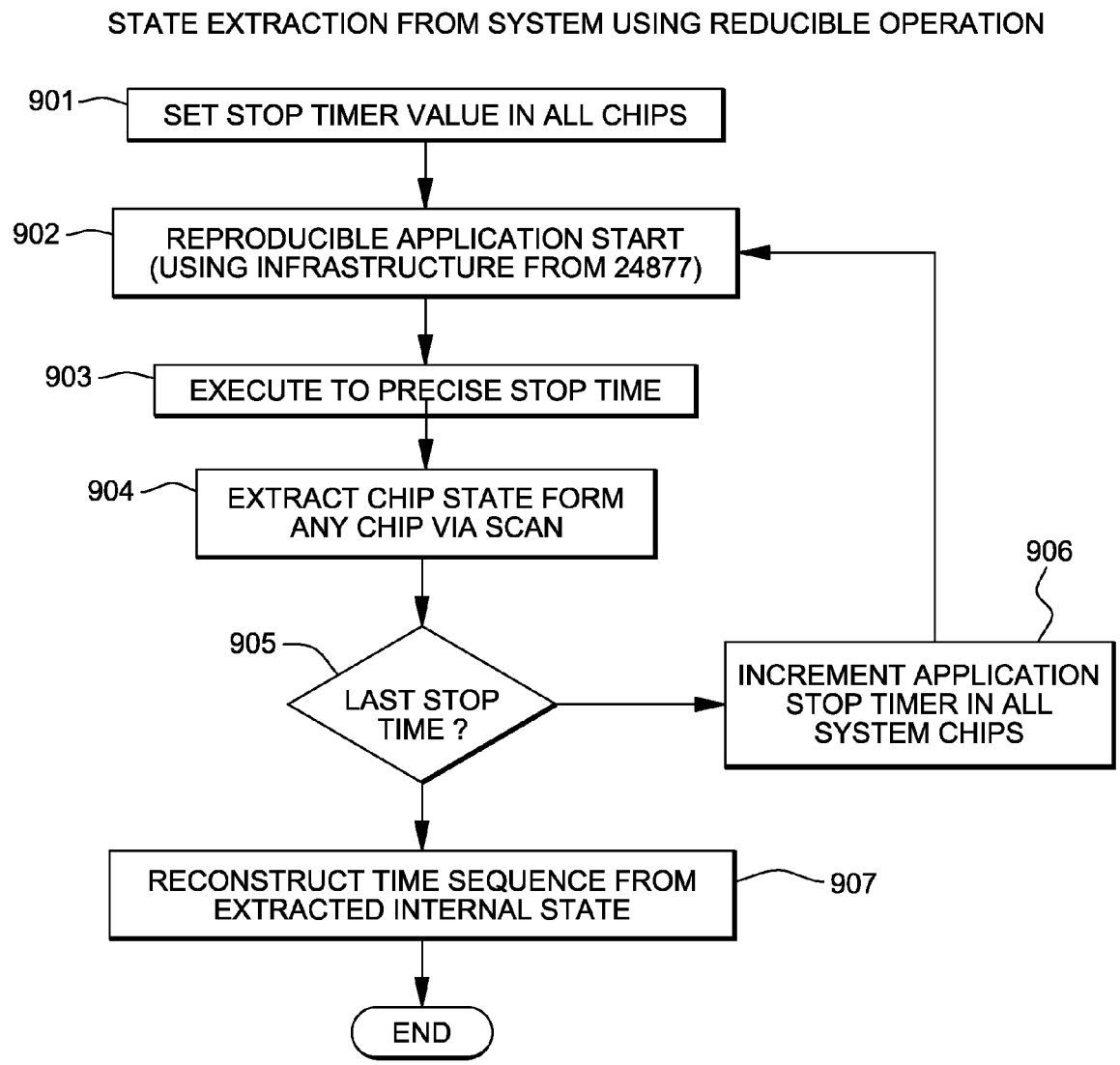
FIG. 3 shows a flowchart to record the chronologically exact hardware behavior of a multiprocessor system.

FIG. 3 shows a flowchart to record the chronologically reproducible hardware behavior of a multiprocessor system.

At 901, a stop timer is set.

At 902, a reproducible application is started (using infrastructure from the "Global Sync" application cited above).

At 903, each segment of the reproducible application, which may include code on a plurality of processors, is run until it reaches the pre-set stop time.

At 904, the chip state is extracted responsive to a scan of many parallel components.

At 905, a list of stored values of stop times is checked. If there are unused stop times in the list, then the stop timer should be incremented at 906 in components of the system and control returns to 902.

When there are no more stored stop times, extracted system states are reviewable at 907.

Roughly speaking, the multiprocessor system is composed of many thousands of state machines. A snapshot of these state machines can be MBytes or GBytes in size. Each bit in the snapshot basically says whether a transistor is 0 or 1 in that cycle. Some of the state machines may have bits that do not matter for the rest of the system. At least in a particular run, such bits might not be reproduced. Nevertheless, the snapshot can be considered "exact" for the purpose of reproducibility of the system.

The above technique may be pragmatic. For example, a MByte or GByte event trace may be conveniently stored on the a disk or other mass storage of the external host computer 180. For example, the use of mass storage allows the event trace to include many cycles; and the external host computer can be programmed to only record a selected subset of the states of the multiprocessor system 100.

The above technique can be used in a flexible fashion, responsive to the particular error situation. For instance, the technique need not require the multiprocessor system 100 to continue execution after it has been stopped and scanned. Such continuation of execution might present implementation difficulties.

Figure 4:
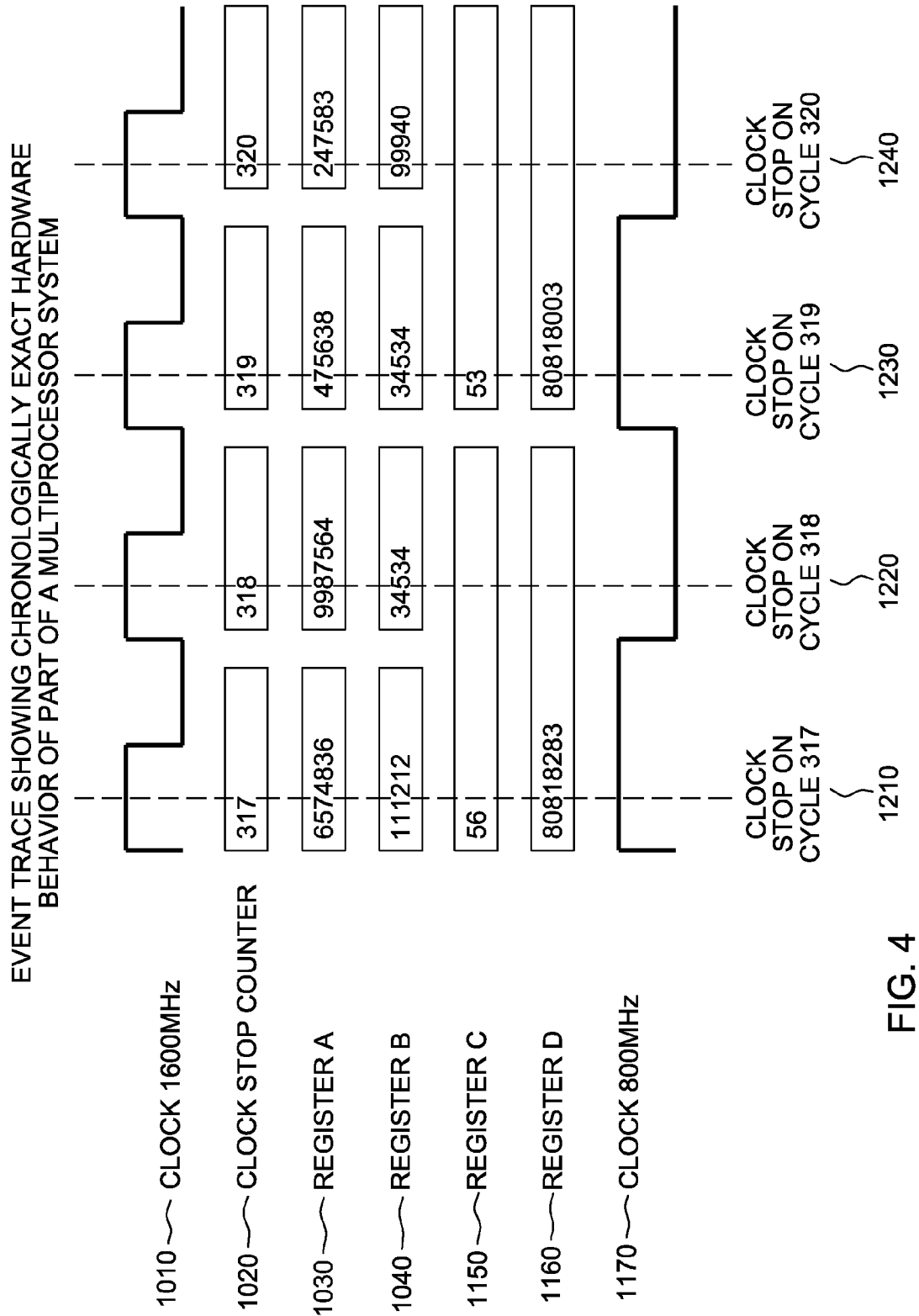
FIG. 4 shows a timing diagram relating to reproducibility.

FIG. 4 shows a timing diagram illustrating reproducible operation with respect to registers of a system. A system clock is shown at 1010. Line 1170 shows a clock derived from the system clock. At 1020 the operation of a clock stop timer is illustrated. Line 1020 includes a rectangle 317-320 for each represented, numbered cycle of the clock stop timer. Clock stops for the timer are shown by vertical lines 1210, 1220, 1230, 1240, and they are offset within the clock cycles. Lines 1030, 1040, 1150, and 1160 show the operation of registers A, B, C, and D, respectively relevant to the clock cycles 1010 and

1170. Registers A and B change value at a frequency and at times determined by the system clock 1010. Registers C and D change value at a frequency determined by the derived clock 1170. These registers may be located within or associated with any unit of the multiprocessor system. It can be seen that registers change value in lock step, throughout the system. The values illustrated are arbitrary, for illustration purposes only. Register A is shown storing values 6574836, 9987564, 475638, and 247583 in four successive system clock cycles. Register B is shown storing values 111212, 34534, 34534, and 99940 in four successive system clock cycles. Register C is shown storing values 56 and 53 in two successive cycles of the derived clock 1170. Register D is shown storing values 80818283 and 80818003 in two successive cycles of the derived clock 1170. In each case, the register changes value at a precise time that depends on the system clock, no matter which unit within the system the register is associated with.

When the clockstop timer 240 stops the clocks, all registers are stopped at the same time. This means a scan of the latch state is consistent with a single point in time, similar to the consistency in a VHDL simulation of the system. In the next run, with the clock stop timer 240 set to the next cycle, the scanned out state of some registers will not have changed. For example, register in a slower clock domain will not have changed values unless the slow clock happens to cross over a rising edge. The tool creating the event traces from the extracted state of each run thus simply appends the extracted state from each run into the event trace.

Figure 5:
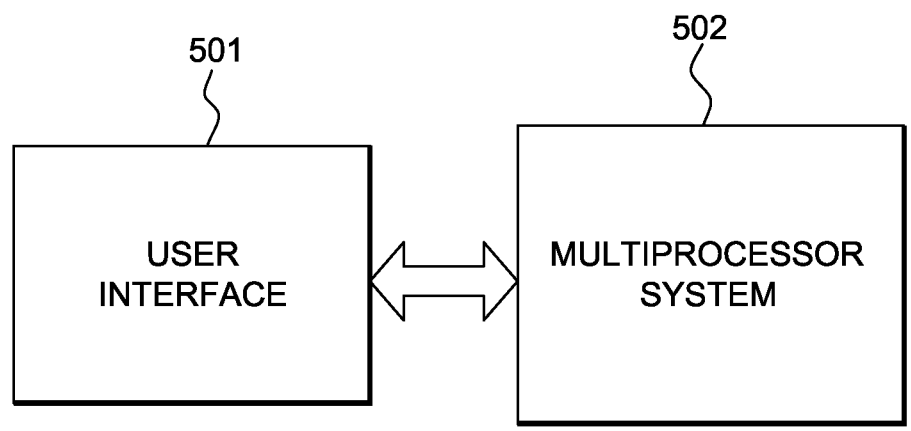
FIG. 5 shows a multiprocessor system with user interface

FIG. 5 shows an overview with a user interface 501 and a multiprocessor system 502. All of the other figures can be understood as being implemented within box 502. Via the user interface, a programmer or engineer can implement the sequence of operations of FIG. 3 for debugging the hardware or software of system 502.

The flowchart and/or method block diagrams in FIG. 3 illustrate the architecture, functionality, and operation of possible implementations of systems, methods and computer program products according to various embodiments of the present invention. In this regard, each block in the flowchart or method block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

There is no intention here to claim mental steps, manual operation, laws of nature, or disembodied mathematics. Any anthropomorphic language is intended to refer to automated operation within at least one digital data processing device, unless otherwise indicated, for instance by the words "user" or "programmer."

The invention claimed is:

1. A multiprocessor system, comprising:
a single system clock;
facilities for generating a plurality of system wide synchronization events;
a plurality of units running in parallel, each unit being characterized by the following features:
deterministic start state;
at least one deterministic interface;
a clock generator unit receiving a system clock, wherein all clocks within the unit are derived from the system clock and are phase aligned relative to the system clock;
zero-impact communication with the other units; and
facilities adapted to precisely stop the unit in conjunction with the other units of the system, said facilities comprising a local timer device in each unit coupled to said clock generator unit, said local timer device being set to a stop time threshold value and, responsive to reaching said stop time threshold value, said local timer providing a stop timer signal to said clock generator to responsively halt one or more pre-selected clocks within the unit, and
extraction facilities adapted to scan system state responsive to such precise stopping.

2. The system of claim 1, wherein the local timer device of said facilities is adapted to precisely stop a plurality of system elements at a selectable and reproducible clock cycle.

3. The system of claim 1, wherein the deterministic start state is established responsive to reset of relevant system components for each run.

4. The system of claim 1, wherein the deterministic start state is established responsive to control by an external host computer.

5. The system of claim 1, wherein the deterministic interface comprises at least one asynchronous interface macro that functions across chips being adapted not to reset responsive to establishment of the start state.

6. The system of claim 1, wherein the deterministic interface comprises
at least one asynchronous interface macro; and
at least one associated delay shift register for compensating for interface delays.

7. The system of claim 1, wherein the deterministic interface is synchronous.

8. The system of claim 1, comprising a mailbox adapted to implement zero impact communication with other units.

9. The system of claim 1, wherein the stopping and extracting are repeatable.

10. A method for debugging a multiprocessor system comprising precisely stopping all elements responsive to a system-wide clock, said method comprising:
generating, using a clock generator unit receiving a system clock, all clocks for use within the unit, said all clocks within the unit being derived from the system clock and are phase aligned relative to the system clock; and
setting a local timer device in each unit coupled to said clock generator unit to a stop time threshold value,
for said debugging, detecting reaching of said stop time threshold value at said local timer device, and
providing, by said local timer, a stop timer signal to said clock generator to responsively halt one or more pre-selected clocks within the unit.

11. The method of claim 10, comprising during operation phase aligning local clocks of individual elements responsive to the system clock.

12. The method of claim 10, comprising setting an initial state of individual elements to a fixed state prior to debugging.

13. The method of claim 10, comprising operating the system interfaces in a deterministic fashion.

14. The method of claim 13, comprising treating asynchronous interface macros as static components and not resetting them.

15. The method of claim 13, comprising compensating for a delay associated with a system interface.

16. The method of claim 10, comprising communicating in a zero impact fashion amongst elements of the system.

17. The method of claim 10, comprising
repeating the stopping over a sequence of clock cycles;
creating an event trace including information extracted responsive to each instance of stopping.

18. A computer method for debugging a multiprocessor system, comprising performing operations within the system, the operations comprising, not necessarily in the following order:
a) setting at least one stop timer value for a local timer device in at least one respective processing unit within the system, said local timer device in said unit coupled to a clock generator device in said unit, said clock generator device providing all clocks within the unit derived from a system clock and are phase aligned relative to the system clock;
b) creating a reproducible system start;
c) running to a precise time established by the stop timer value and in response, halting one or more pre-selected clocks within the unit;
d) extracting relevant states from the system;
e) repeating a-d for a predetermined number of cycles; and
f) providing an event trace responsive to the extracted relevant states.

19. The method of claim 18, comprising running interfaces between the units in a deterministic fashion.

20. The method of claim 19, wherein creating a reproducible system start comprises not resetting asynchronous macros within the interfaces.

21. The method of claim 19, wherein creating a reproducible system start comprises running interfaces synchronously.

22. A computer program product, the computer program product comprising:
a storage medium, said storage medium not a propagating signal, said storage medium readable by a processing circuit and storing instructions to be run by the processing circuit for performing a method comprising:
setting a stop timer value in a respective stop timer in each of a plurality of modules of a multi-processor system, said stop timer in a respective module coupled to a clock generator device in said module, said clock generator device providing all clocks within the module derived from a system clock and are phase aligned relative to the system clock;
invoking at least one hardware synchronization event for creating a reproducible application start in the plurality of modules;
running the system in accordance with a software or hardware protocol to be debugged; and
halting one or more pre-selected clocks within a respective module upon reaching the respective stop timer value setting of each stop timer,
extracting at least one relevant state from at least one of the plurality of modules at the set stopping time.

23. The product of claim 22, comprising
repeating the invoking, running, and extracting for a predetermined number of cycles; and
reconstructing a sequence of relevant states for at least one of the plurality of modules.

* * * * *